May 1, 1934.  C. A. FAUSEL  1,957,136
AUTOMATIC MACHINERY
Filed July 29, 1932  2 Sheets-Sheet 2
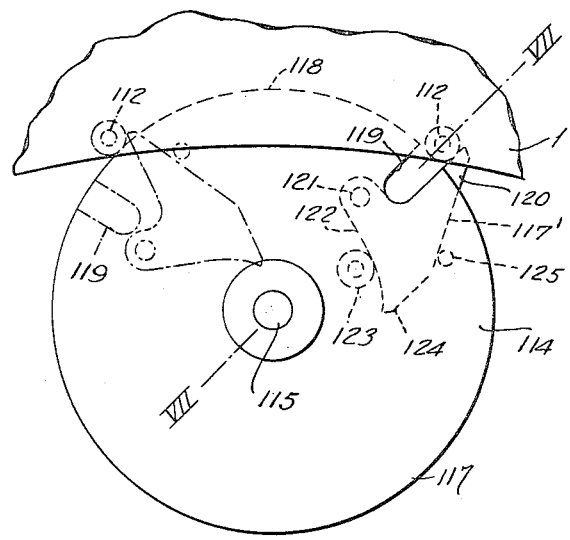
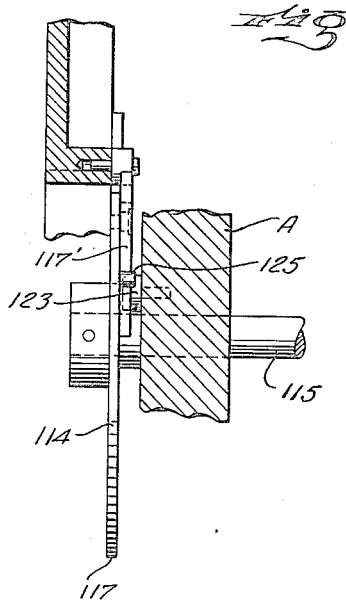
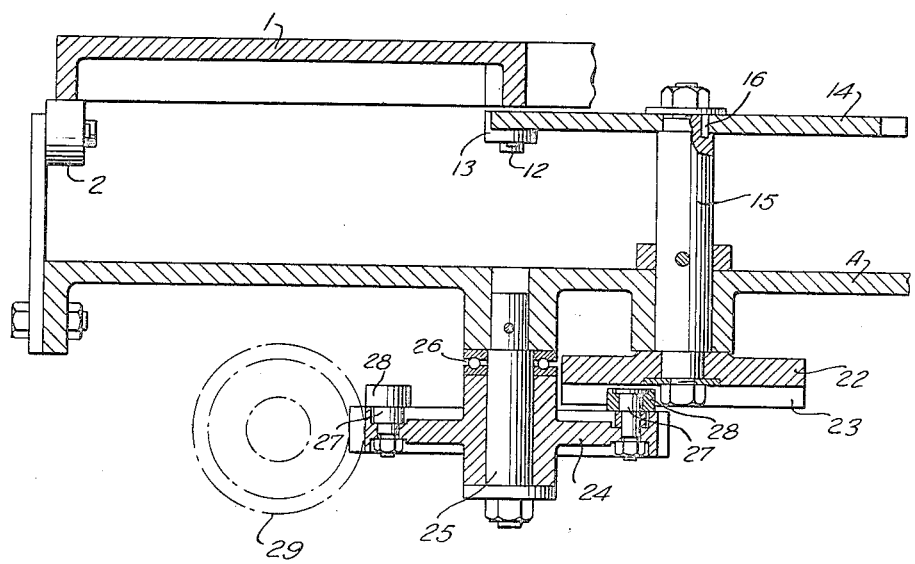
INVENTOR.
CHARLES A. FAUSEL
BY
ATTORNEY Patented May 1, 1934

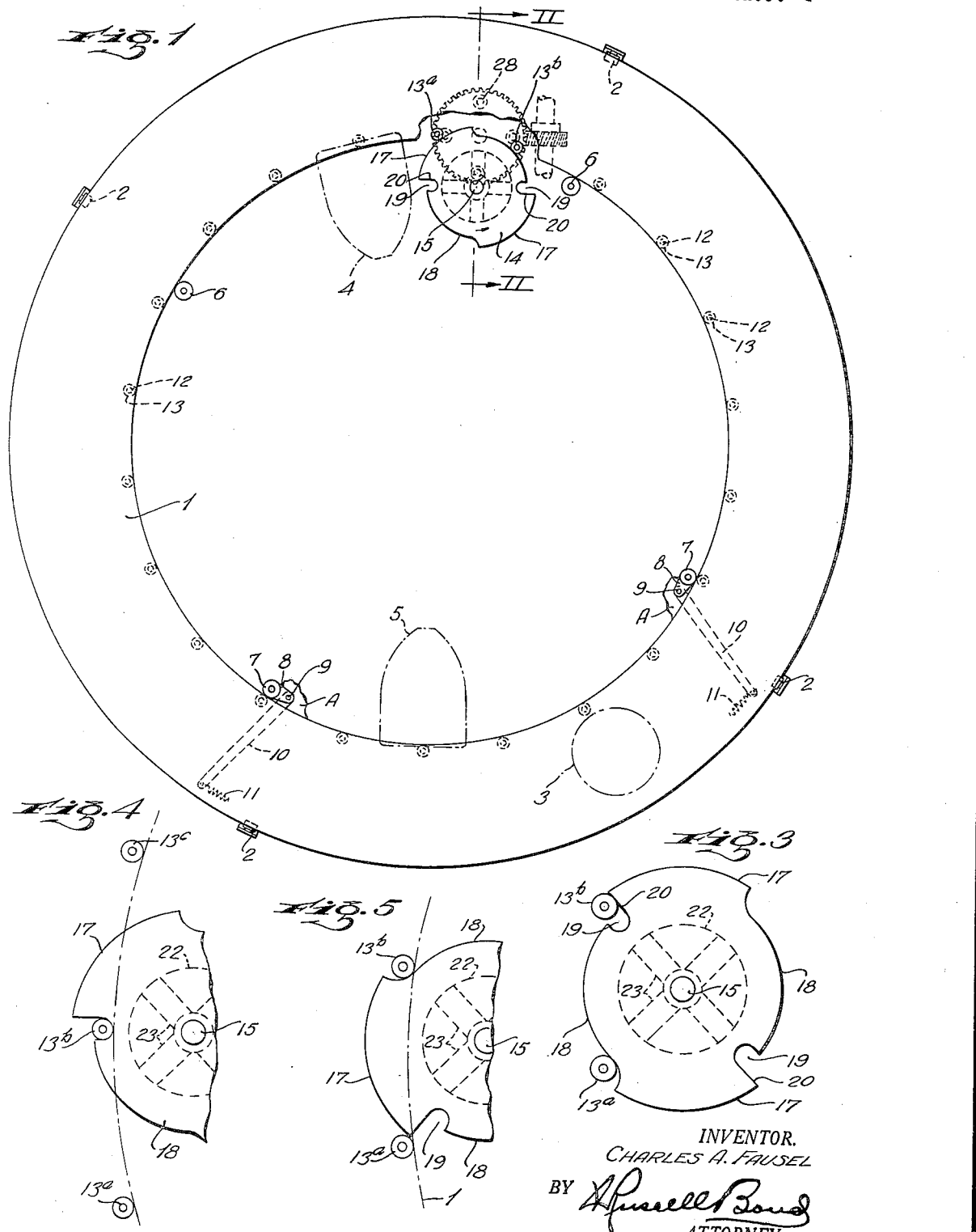

1,957,136

UNITED STATES PATENT OFFICE 1,957,136

AUTOMATIC MACHINERY

Charles A. Fausel, Glenridge, N. J., assignor to Harry Russell Brand, New York, N. Y.

Application July 29, 1932, Serial No. 626,091

5 Claims. (Cl. 53—7)

This invention relates to automatic machinery and with regard to its more specific features to a movement for imparting to a travelling member an intermittent motion. The invention is particularly applicable to the movement of large circular members such as griddles for the cooking of cakes where the member is moved forward with a step by step motion as in machines of the kind described in Patent No. 1,848,104, issued March 8, 1932.

It is an object of this invention to provide new and improved means for moving the member which will start the member from rest and bring it up to speed and bring it to rest again at the close of the movement, smoothly, efficiently, and without jar.

It is a further object to provide a movement which will impart to the member, a smooth intermittent motion and will automatically lock the member against movement when the motion is complete until the time for the next movement has arrived.

It is a further object to provide a device of the character described which will be rugged in construction and simple and efficient in operation.

It is a further object to provide a device which will function efficiently at widely varying temperatures of the griddle such as may be encountered in the cooking operation.

It is a further object to provide a device which will automatically compensate for any expansion or contraction, without any accompanying displacement of the member such as to interfere with the driving mechanism or with automatic machinery with which the member may be associated.

Since this invention is particularly applicable to the moving of a circular griddle in an automatic pan-cake baking machine, it is particularly illustrated in that connection. Its other applications will be obvious therefrom.

The invention accordingly comprises the features of construction, combination of elements, and arrangements of parts, which will be exemplified in the construction hereinafter set forth and the scope of the application of which will be indicated in the claims.

For a fuller understanding of the nature and objects of the invention reference should be had to the following detailed description taken in connection with the accompanying drawings.

Figure 1 is a plan view of a portion of a machine embodying this invention as applied to a circular griddle;

Fig. 2 is a section on the line II—II of Fig. 1;

Figs. 3, 4, and 5 are details of the Geneva movement showing different positions of the parts at the beginning, middle, and close of the griddle movement;

Fig. 6 is a fragmentary plan view of a modification; and

Fig. 7 is a section on the line VII—VII of Fig. 6.

In the drawings, the numeral 1 designates an annular griddle which may be supported for rotation about its axis in any convenient manner. As illustrated, there are provided a plurality of rollers 2, which engage the periphery of the griddle and are themselves supported in any convenient manner.

The numeral 3 indicates in dotted lines the position in which a batter pouring mechanism may be placed and at 4 and 5 are indicated suitable cake handling mechanism which may take the form of peels. The peel 4 may be used to reverse the cake upon the griddle, and the peel 5 may be used to remove the cake from the griddle after it is cooked.

The griddle is held substantially centrally positioned about its axis by a plurality of rollers 6—6 and 7—7 which engage its inner periphery. Two of these rollers 6—6 which are adjacent to the driving mechanism may be journalled upon a stationary portion of the frame A while two of the rollers 7—7 are movable toward and away from the rollers 6—6 to allow for expansion of the griddle. As illustrated, they are journalled upon bell crank levers 8 which are pivoted to the frame at 9 and have their longer arms 10 controlled by springs 11, whereby, as the griddle expands due to the heat, the rollers 7—7 may be pressed outwardly to maintain the griddle in contact with the stationary rollers 6—6 and in position to continue to cooperate with the driving mechanism. This movement results in a slight shifting of the axis of the griddle under expansion by heat by an amount equal to one-half of the expansion of its inner diameter. This shifting is in the direction of the center line bisecting between the rollers 6—6 and the rollers 7—7. The rollers are preferably, therefore, so placed that this center line comes midway between the removing peel 5 and a batter pouring mechanism 3 so that the expansion of the griddle produces the minimum angular displacement of the cakes upon the griddle.

The griddle is provided upon its underface with a plurality of pins 12, each carrying a roller 13, and these rollers 13 are equally positioned around the periphery at a distance sufficient to provide for a single cake.

A cam 14 is mounted adjacent to the griddle upon a vertical shaft 15 journalled in the main frame A and to which shaft it is keyed by a pin 16 (see Fig. 2). The cam 14 has distributed around its periphery, a plurality of pairs of concentric surfaces 17—18, each pair separated by a recess 19 having an abrupt shoulder 20. The surface 17 of each pair is of greater diameter than the surface 18 and is such that while the surface 17 is in engagement with one roller 13a (see Fig. 1), the surface 18 will be engaged with the next succeeding roller 13b to hold the griddle firmly against rotary movement.

With this construction it will be clear that while the rollers 13a and 13b are in engagement with the surfaces 17—18, the roller 13b which is in engagement with the surface 17 will be closer to the shaft 15 than the roller 13a. As a consequence, when the cam has moved to the point where the roller 13b is opposite the recess 19, the roller will be encountered by the shoulder 20 because of the greater diameter of the surface 17. On continued rotation of the cam, therefore, the griddle will be moved forwardly with the cam until the roller passes out of the recess 19 and off the edge of the shoulder 20 at the other side of the cam. Fig. 3 shows the position of the cam with regard to the rollers at the beginning of the movement of the griddle. Fig. 4 shows the position at the central portion of the movement, and Fig. 5 shows the position of the parts as the shoulder or projection 20 is about to leave the roller 13a. In this latter position it will be seen that the advance pin 13a has been forced forward enough to ride upon the outer surface 17 of the next pair, and by that movement the next succeeding pin 13b has been brought forward sufficiently to encounter the inner surface 18 of that pair. The griddle is therefore held in locked position until the next projection 20 of the cam encounters the next succeeding pin.

As will be seen, the design of the cam 14 makes it possible, even if the cam be moved at a uniform speed, to increase the speed of the griddle gradually to a maximum at the middle of the movement and then gradually decrease in speed as the angular position of the rollers 13b change relative to the cam.

For many purposes, however, particularly where automatic pouring and heavy griddles are required, I prefer still further to increase the period of rest and further to accentuate the acceleration and deceleration of the griddle. To accomplish this purpose, there is provided upon the lower end of the shaft 15, a cam 22 having, as will be seen in dotted lines in Fig. 1, transverse slots 23 cut in the under face thereof; and maintained adjacent to the cam 22, is a spiral gear 24 journalled upon a shaft 25 which may be provided with ball bearings 26. This gear 24 carries a plurality of pins 27, equally spaced around its periphery, each of which carries a roller 28 adapted to enter into and fit within the slot 23 of the cam 22 as the spiral gear 24 rotates. This spiral gear 24 and the spacing of the pins are so designed that one of the rollers 28 will leave one of the slots 23 as the next roller 28 enters the next slot 23 during the rotation of the gear 24. The gear 24 may be driven by a meshing spiral gear 29.

With this construction it will be clear that on a uniform rotation of the shaft 29 and the spiral gear 24, the pins 28 will cause little if any angular rotation of the shaft 15 at the time when the rollers 28 first enter the slots 23, by reason of the fact that the rollers enter the slots almost, or quite radially. However, the cam 22 will be rapidly accelerated as the rollers move in toward the center of the shaft 15 and the rotation of the shaft 15 will be rapidly decelerated from that time until the roller 28 leaves the slot.

It will thus be seen that the cam 14 is gradually accelerated from rest from the position of Fig. 3 and thus the griddle is gradually started in its movement and that it is gradually brought to rest at the position shown in Fig. 5, bringing the griddle to a stop. This results in a prolongation of the period of rest of the griddle and in an accentuation of the acceleration and deceleration of the griddle so that, in effect, the starting and stopping of the griddle motion is accomplished without any jar.

Moreover, by reason of the relative positioning of the rollers 6—6 to the rollers 7—7, it will be seen that the griddle is always maintained in a position to cause the rollers 13 to cooperate with the cam 14.

In the modification illustrated in Fig. 6, the cam 114 may have a uniform outer periphery 118 sufficient to extend between two pins 112 to hold the griddle against movement. In the periphery of the cam is a recess 119 into which the pins 112 may be projected.

In this embodiment, as the cam rotates, the pin 112, riding on the surface 118, is not sufficiently close to the shaft 115 to cause the roller to be engaged by the recess 119. There is, therefore, provided a detent 117 pivoted to the cam at 121 and having an extending portion 120 which may project outwardly beyond the periphery 118 to engage the roller. This detent 117 has a cam surface 122 in position to be engaged by a roller 123 fixed upon the frame A, and this cam surface is such as to bring the projection 120 of the detent into engagement with the roller 112 at the time when it is intended to begin the movement of the griddle and while the roller is opposite to the recess 119. As soon, thereafter, as the roller has entered the recess 119 and is in position to be controlled thereby, the lower end or heel 124 of the cam surface 122 passes off of the roller 123 permitting the detent 117 to be moved clockwise about its pivot 121. As the rotation of the shaft 115 continues, the roller 112 passes in toward the center and then on toward the periphery again and finally leaves the recess upon the far side, but at this point it is permitted to ride over upon the surface 118 because it is no longer constrained by the detent 117. A pin 125 serves to limit the movement of the detent in both directions to an amount which is necessary to accomplish its purpose.

With this form of the invention it will be clear that the detent 117 and its projection 120 serve the purpose of the shoulder 20 of the former modification in that they are in a position to contact with and move the griddle at the time the pins of the griddle come opposite the recess in the cam.

With either of the above constructions it will be clear that the griddle may be allowed a period of rest as long as may be desired and on completion of the period of rest it may be moved quickly and without jar to its next position of rest. Moreover, because of the high acceleration and deceleration employed, the movement may be effected in a minimum of time without jarring the machinery.

Thus by the above constructions are accomplished the objects hereinbefore set forth.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the general and specific features of the invention herein described, and all statements of the scope of the invention which, as a matter of language, might be said to fall therebetween.

Having described my invention, what I claim as new and desire to secure by Letters Patent, is:—

1. In a device of the character described in combination, an annular griddle, means for supporting said griddle for rotation about a vertical axis, driving means for said griddle, and means for maintaining said griddle in lateral position including a plurality of rollers adapted to engage the periphery of said griddle, and certain of said rollers adjacent to said driving means being mounted upon fixed shafts and certain of said rollers upon the side of said griddle opposite to the driving means being mounted for resilient radial movement toward said griddle.

2. A device of the character described comprising in combination an annular griddle, means for supporting said griddle for movement about a vertical axis, said griddle being adapted to be associated with diametrically disposed cake handling means, and means for controlling the lateral position of said griddle including rollers adapted to engage the periphery thereof upon different sides, certain of said rollers adjacent to one of said cake handling means being mounted in fixed position and the rollers adjacent to one of the others of said cake handling means being movable laterally toward and away from said first mentioned rollers and resilient means for urging said rollers firmly against said griddle.

3. In a device of the character described in combination, an annular griddle, means for supporting said griddle for rotation about a vertical axis, driving means for said griddle, and means for maintaining said griddle in lateral position, including four rollers adapted to engage the periphery of said griddle; two of said rollers adjacent to said driving means being mounted in fixed position and the other two of said rollers upon the side of said griddle opposite to the driving means being mounted for resilient radial movement toward said griddle.

4. In a device of the character described in combination, an annular griddle, means for supporting said griddle for rotation about a vertical axis, driving means for said griddle, and means for maintaining said griddle in position laterally including a plurality of rollers adapted to engage the inner periphery of said griddle, said rollers adjacent to said driving means being mounted upon fixed shafts and at least one of the rollers upon the side of the griddle opposite to the driving means being mounted for resilient radial movement toward said griddle.

5. In a device of the character described in combination, an annular griddle, means for supporting said griddle for rotation about a vertical axis, driving means for said griddle, and means for maintaining said griddle in position laterally including a plurality of rollers adapted to engage the inner periphery of said griddle, said rollers adjacent to said driving means being mounted upon fixed shafts, a bell crank, one of the rollers being mounted on an arm of the bell crank, and a spring acting on the other arm of the bell crank to force the roller carried by the lever against the griddle.

CHARLES A. FAUSEL.